United States Patent [19]
Adams

[11] 4,372,280
[45] Feb. 8, 1983

[54] FUEL VAPORIZER

[75] Inventor: Jerry W. Adams, Colony, Tex.

[73] Assignee: JEB Energy Industries, Inc., Dallas, Tex.

[21] Appl. No.: 255,267

[22] Filed: Apr. 17, 1981

Related U.S. Application Data

[63] Continuation-in-part of Ser. No. 67,879, Aug. 20, 1979, Pat. No. 4,274,383.

[51] Int. Cl.³ .............................................. F02M 17/22
[52] U.S. Cl. .................................. 123/557; 123/522; 123/523; 261/DIG. 83
[58] Field of Search ....................... 123/557, 522, 523; 261/144, 145, DIG. 6, 119, DIG. 50, DIG. 83

[56] References Cited

U.S. PATENT DOCUMENTS

| | | | |
|---|---|---|---|
| 499,597 | 6/1893 | Salomon | 123/522 |
| 1,234,530 | 7/1917 | Cunningham | 261/DIG. 83 |
| 1,246,305 | 11/1917 | Mundhenk | 261/DIG. 6 |
| 1,263,570 | 4/1918 | LaChapelle | 261/DIG. 6 |
| 1,403,848 | 1/1922 | Forrest | 123/522 |
| 1,938,497 | 12/1933 | Pogue | 261/DIG. 83 |
| 2,390,979 | 12/1945 | Young | 123/522 |
| 2,461,411 | 2/1949 | Cummings | 123/522 |
| 2,748,796 | 6/1956 | Schweiss | 261/DIG. 50 |
| 3,713,429 | 1/1973 | Dwyre | 123/522 |

FOREIGN PATENT DOCUMENTS

| | | | |
|---|---|---|---|
| 90554 | 1/1919 | Switzerland | 123/522 |
| 93899 | 1/1919 | Switzerland | 261/DIG. 6 |

*Primary Examiner*—Ronald H. Lazarus
*Attorney, Agent, or Firm*—Hubbard, Thurman, Turner & Tucker

[57] ABSTRACT

Hot water is transmitted from an automobile's cooling system to a fuel vaporizer wherein it is utilized to heat gasoline to a vapor state. Air is drawn into the fuel vaporizer utilizing carburetor vacuum and is added to the vapor and drawn into the carburetor. Vaporized fuel and outside air are mixed in a separate dry vapor section within the vaporizer and the amount of air allowed to enter the fuel vaporizer is controlled utilizing a valve system. In this manner, the fuel-air vapor is more efficiently burned in the engine and improved gas mileage is achieved.

3 Claims, 6 Drawing Figures

4,372,280

FUEL VAPORIZER

CROSS REFERENCE TO RELATED APPLICATIONS

This application is a continuation-in-part of application Ser. No. 067,879 filed Aug. 20, 1979, now issued as U.S. Pat. No. 4,274,383.

BACKGROUND OF THE INVENTION (1) Field of the Invention

This invention relates to vaporizing liquid fuels and mixing the vapor with air for spark ignition in an internal combustion engine.

(2) Description of the Prior Art

Automobiles are powered almost exclusively by internal combustion engines. With the advent of the energy shortage, people became concerned with the number of miles per gallon that their cars could get. Many cars on the road today have large engines which can produce much more power than is necessary to go the speed limit. These large engines use a great deal of gas. Many methods have attempted to increase the gas mileage of these large engines. These attempts to increase the performance of large engines have met with only varying degrees of success. One area for improvement is better vaporization of the liquid fuel. Different methods for controlling the amount of vapor have been tried. Many inventors have attempted to control the vapor flow by controlling the amount of fuel which is vaporized. This method is usually unsatisfactory as it is very difficult to regulate the rate of vaporization as opposed to the rate of introduction of air into the vaporizer.

Before filing this application, applicant caused a search of the prior art to be made at the United States Patent and Trademark Office. That search disclosed the following patents:

| GRONKWIST | 1,625,997 |
| MENGELKAMP | 2,821,843 |
| AUTHEMENT | 3,963,013 |
| PIERCE | 4,074,666 |
| TOTTEN | 4,106,457 |
| QUINN | 4,146,002 |

QUINN discloses a fuel preheater using hot water from the car's cooling system to vaporize fuel which is mixed with air and forwarded to the carburetor.

TOTTEN discloses a fuel vaporizer for vaporizing fuel using hot water and having a valve for adjusting the amount of fuel sent into the vaporizer.

It appears that the other patents listed are of general interest only. These prior patents show that the vaporization of gas and mixing it with air before it reaches the carburetor increases the gas mileage. However, one of the most perplexing problems has been the regulation of the flow of the vapor into the carburetor. Another problem in the art has been the maintenance of a steady heat in the vapor mixing compartment.

SUMMARY OF THE INVENTION (1) New and Different Function

I have invented a way to improve the gas mileage which may be achieved with internal combustion engines. My invention does not increase the power of the engine, in fact, it is known that preheating the fuel-air vapor before it enters the engine has a tendency to reduce the total output of the engine. In view of the fact that automobiles on the road today have engines which generate far more power than is necessary or present speed limits, the increase in efficiency greatly outweighs the loss of power. I have found that great results are achieved when the introduction of the fuel vapor can be regulated.

My system vaporizes fuel at a rate greater than is necessary to be introduced into the carburetor. The amount of fuel vapor entering the carburetor is varied by varying the amount of air allowed to enter the vaporizer. In this manner I am able to accurately control the amount of vapor introduced into the carburetor and thereby increase the total efficiency of the car's engine.

Thus it may be seen that the function of the total combination far exceeds the sum of the functions of the float valves, air filters, etc.

(2) Objects of this Invention

An object of this invention is to vaporize fuel for an internal combustion engine.

Another object is to vaporize fuel and thoroughly mix the vapor with air.

Further objects are to facilitate adjusting the flow of the vapor-air mixture into the carburetor.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficent, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
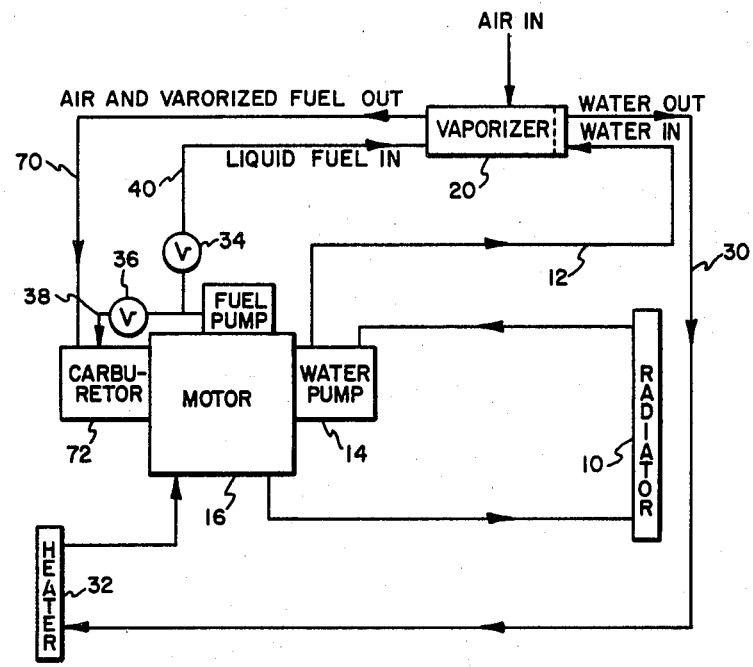
FIG. 1 is a schematic representation showing the organization of the fuel vaporizer with an automobile engine.
Figure 2:
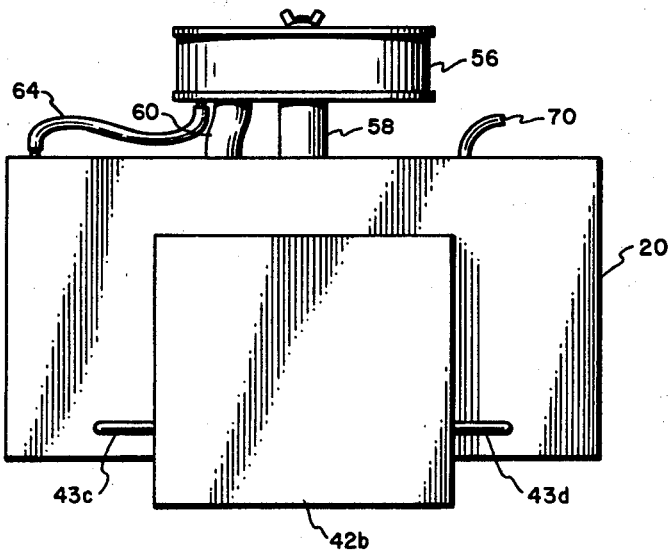
FIG. 2 is a side elevational view of a vaporizer according to my invention.
Figure 3:
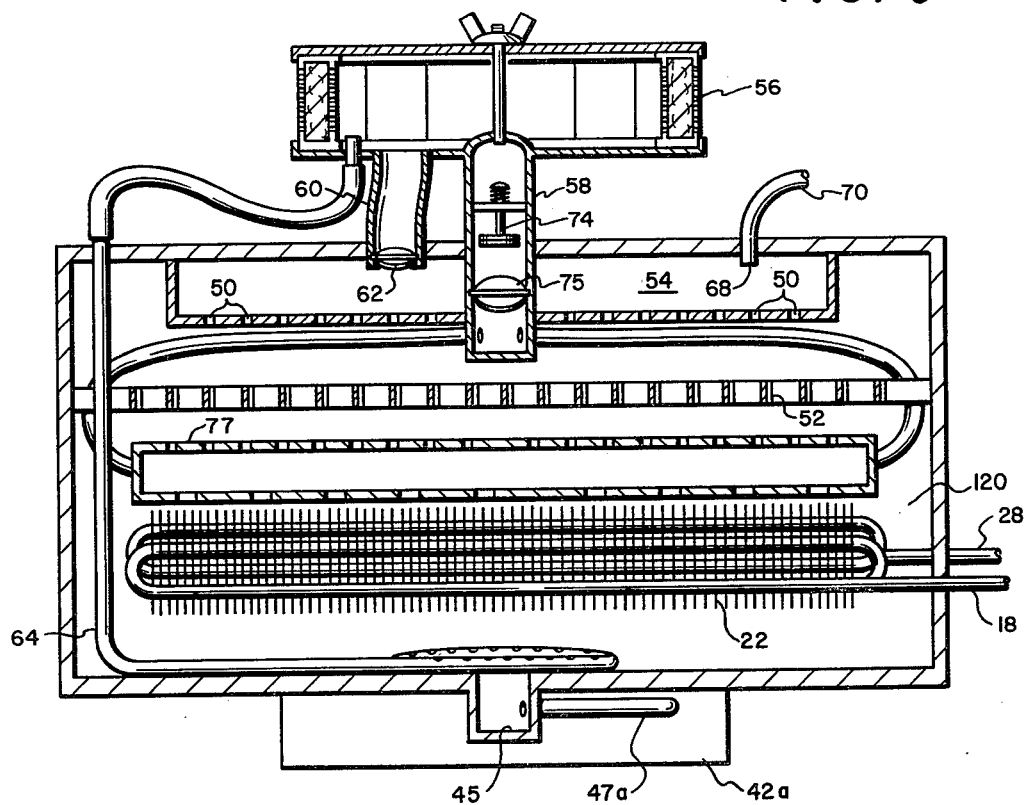
FIG. 3 is a longitudinal section of the vaporizer according to my invention.

Referring more particularly to FIGS. 1 and 3 of the drawing, hot water is transmitted from the cooling system on engine or motor 16 (which includes radiator 10, water pump 14, and heater 32) through hot water line 12 to hot water inlet 18 of vaporizer 20. The hot water is introduced into heat exchanger 22 of the vaporizer. The hot water is forced through heat exchanger 22 and out through return water outlet 28 back to the engine via water return line 30.

After the car's engine is warm, solenoid valve 34 may be electrically opened and solenoid valve 36 closed thereby diverting the liquid fuel from fuel line 38 to vaporizer inlet line 40 into fuel reservoir tanks 42a and 42b, which are mounted on the sides of vaporizer 20. In alternate embodiments, valve 34 may be eliminated and the inlet line 40 may always be open. The level of the fuel in the fuel reservoir tanks 42a and 42b is controlled by fuel float valves 44a and 44b (See FIG. 5c).

The fuel inlet line 40 terminates at fuel float valves 44a and 44b. When the fuel level drops, the valves are opened and more fuel enters fuel reservoir tanks 42a and 42b. It will be apparent to those skilled in the art that fuel float valves 44a and 44b are mounted in opposite directions. This mounting technique will have the effect of counteracting any yaw or pitch which may result from rapid maneuvers of the automobile in which vaporizer 20 may be mounted.

Heat radiates from the heat exchanger 22, heating some of the fuel in the pool to a vapor state. The fuel vapor then rises from vapor compartment 120 through spacer grill 52 and through holes 50 into vapor mixture compartment 54.

Outside air enters the vaporizer 20 through an air inlet system. As air enters the inlet system it passes through one of three separate sections of vaporizer air filter 56 and proceeds through air inlet 58 into vapor compartment 120 or through air inlet 60 and control valve 62 into vapor mixture compartment 54. Air may also be drawn into vapor compartment 120 through sparge tube 64. Sparge tube 64 draws air into vapor compartment 120 down into the fuel area and thereby assists in the vaporization thereof. Sparge tube 64 also acts as a surge retarder and thereby prevents unwanted sloshing of the fuel. The vapor-air mixture is transmitted through vapor outlet 69 through vapor line 70 to the carburetor 72.

Figure 4A:
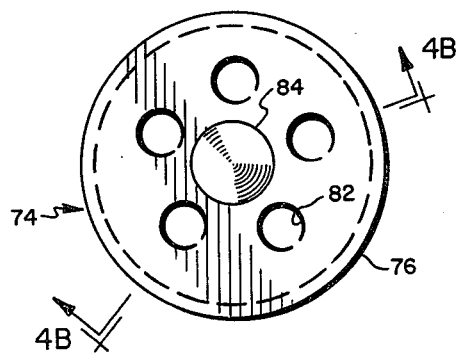
FIG. 4a is a top plan view of the backfire check valve.
Figure 4B:
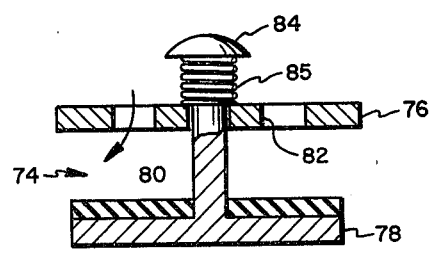
FIG. 4b is a sectional view of the check valve.

Check valve 74 is located below vaporizer air filter 56 in the air inlet 58. The check valve, shown in FIGS. 4a and 4b, has two discs, upper disc 76 and lower disc 78. Lower disc 78 is suspended by piston 80 below the upper disc. The lower disc has a diameter less than the diameter of air conduit 58 while the upper disc 76 has a diameter equal to the diameter of the air conduit 58. Upper disc has five check valve holes 82 arranged around the termination 84 of the piston. In the operating, down position, air passes through holes 82 and around the perimeter of lower disc 78 into the vapor compartment 120. In the case of a backfire, the lower disc 78 is forced up against the upper disc 76 effectively closing the air supply into and out of the air inlet 58 from the vapor compartment 120. Spring 85 holds the lower disc 78 up in the closed position when there is no air flow as seen by the arrows in FIG. 4b. This prevents the flow of vapors through the filter 56 when the engine is stopped.

Also located in air conduit 58 is control valve 75. Control valve 75 and control valve 62 are both vacuum operated butterfly valves. In the embodiment of the invention actually constructed, control valves 75 and 62 are operated utilizing engine vacuum; however, it is within the intended scope of this disclosure that alternate methods of control, including, but not limited to, electric, electromechanical or electronic microprocessor based control systems may be utilized to operate control valves 75 and 62.

Control valve 75 has the effect of increasing or decreasing the amount of vapor created in vaporizer 20, over and above that minimum amount created by means of air which enters via sparge tube 64, by metering the amount of air allowed to enter vapor compartment 120. Air entering vapor compartment 120 through control valve 75 is distributed through air manifold 77. Air manifold 77 is constructed with small perforations in its upper surface and larger holes in the lower surface. Experimentation has shown this configuration will aid in fuel vaporization.

Control valve 62 is utilized to control the richness or leanness of the vapor mixture by adding air to the vapor mixture in vapor mixture compartment 54.

Figure 5A:
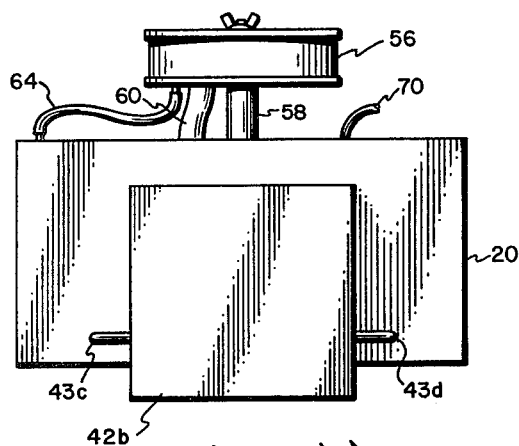
FIG. 5a is a side view of the vaporizer showing the placement of one of the fuel reservoir tanks.
Figure 5B:
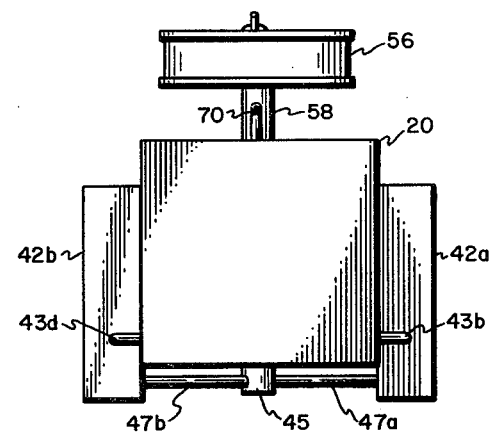
FIG. 5b is an end view of the vaporizer showing both fuel reservoir tanks and the fuel supply lines.
Figure 5C:
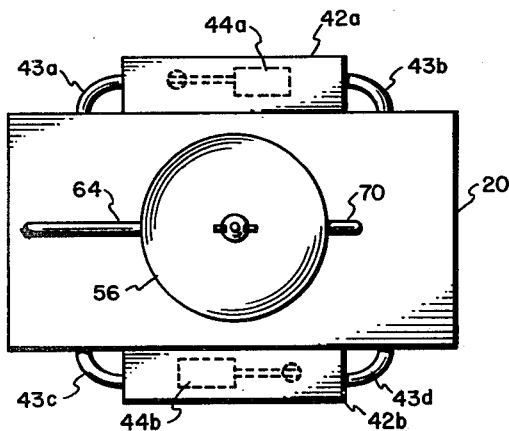
FIG. 5c is a top view of the vaporizer showing the fuel return line and the opposed nature of the float valves within the fuel reservoir tanks.

FIGS. 5a, 5b, 5c and 5d depict the novel configuration of fuel reservoir tanks utilized in the illustrated embodiment of my invention. FIG. 5a shows a side view of vaporizer 20 with fuel reservoir tank 42b. Overflow tubes 43c and 43d prevent the level of fuel present in vapor compartment 120 from rising too high under the vacuum created by carburetor suction. Overflow tubes 43c and 43d are present at either end of fuel reservoir tank 42b to compensate for nonhorizontal positioning during automobile maneuvering.

Figure 5D:
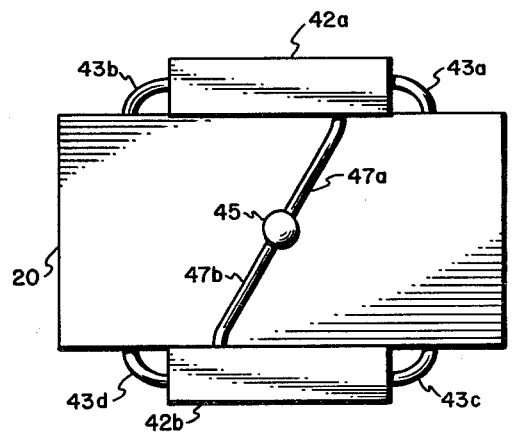
FIG. 5d is a bottom view of the vaporizer showing the opposed nature of the fuel supply lines from the fuel reservoir tanks to the vaporizer.

FIGS. 5b and 5d depict the connection of fuel supply lines 47a and 47b to fuel supply header 45. As depicted in FIG. 5d, the fuel supply lines are connected to fuel reservoir tanks 42a and 42b at opposite ends. This connection configuration, along with the opposing float valve configuration previously discussed, will have the effect of negating transient changes in attitude of vaporizer 20.

Figure 6:
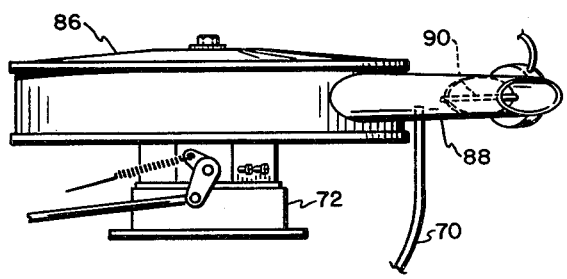
FIG. 6 is a perspective view of the air filter on the engine carburetor showing the fuel-air introduction unit according to my invention.

Carburetor air filter 86 is fitted to receive vapor line 10 which terminates in air filter intake 88 and it is through this intake that the air-fuel vapor is introduced into the carburetor 72. Carburetor air filter 86 is depicted in FIG. 6.

Air filter intake 88 also includes control valve 90. Control valve 90 is utilized to control the aperture of air filter intake 88. During cold start operation, when the engine is utilizing liquid fuel, control valve 90 opens and allows outside air to enter carburetor 72.

When the temperature of the cooling system of the car is sufficiently high to permit gas vaporization, control valve 90 is closed and valves 34 and 36 shift positions. Liquid fuel is no longer utilized by carburetor 72 and vaporized fuel enters air filter intake by means of vapor line 70.

Control valve 90 is vacuum operated in the embodiment disclosed and may be enabled utilizing an electric solenoid at the point where operating temperatures will permit vaporization. Again, as discussed above, alternate embodiments of the fuel vaporization techniques taught in this application may utilize electrically operated control valves in place of vacuum operated valves.

In an embodiment not shown in the accompanying figures, a small line may be inserted into carburetor air filter 86 to detect the vacuum present at the carburetor intake port. The vacuum thus detected may be utilized directly or indirectly to control any or all of the vacuum operated control valves depicted herein.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

What is claimed is:

1. A fuel vaporizer system comprising:
   a vapor compartment for vaporizing liquid fuel;
   a heat exchanger disposed within said vapor compartment;
   a liquid fuel supply means coupled to said vapor compartment;
   input means for introducing ambient air into said vapor compartment, said input means including an air manifold having a plurality of small apertures disposed in the upper surface thereof and a plurality of larger apertures disposed in the lower surface thereof;
   a check valve located at said input means for ceasing the introduction of ambient air into said vapor compartment in response to positive pressure therein; and
   a vapor mixture compartment located above said vapor compartment having a plurality of apertures located therein to permit entry of vaporized fuel from said vapor compartment, a control valve for selectively controlling the entry of ambient air into said vapor mixture compartment, and vapor outlet means adapted to be connected to an internal combustion engine.

2. The fuel vaporizer system according to claim 1 wherein said check valve comprises:
   an upper disc having apertures therethrough;
   a lower disc attached to a piston, said piston running through a central aperture in said upper disc; and
   a spring biasing said lower disc toward said upper disc.

3. The fuel vaporizer system according to claim 1 wherein said input means for introducing ambient air into said vapor compartment includes a sparge tube located on the bottom of said vapor compartment.

* * * * *